(12) United States Patent
Qu et al.

(10) Patent No.: US 7,483,760 B2
(45) Date of Patent: Jan. 27, 2009

(54) MECHANISM FOR EXECUTION OF GLOBAL FLOW CHANGES IN A MANUFACTURING SYSTEM

(75) Inventors: Jiang Qu, Portland, OR (US); Ercan U. Acar, Portland, OR (US); Charles H. Winstead, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 11/312,131

(22) Filed: Dec. 20, 2005

(65) Prior Publication Data

US 2007/0142947 A1    Jun. 21, 2007

(51) Int. Cl.
*G06F 19/00* (2006.01)

(52) U.S. Cl. .................. 700/97; 700/100; 700/103; 700/105; 707/100

(58) Field of Classification Search .............. 700/83, 700/95, 97–100, 103, 105, 182; 707/8, 9, 707/100
See application file for complete search history.

(56) References Cited

U.S. PATENT DOCUMENTS

| | | | | |
|---|---|---|---|---|
| 5,721,943 A * | 2/1998 | Johnson | ...................... | 713/300 |
| 5,787,262 A * | 7/1998 | Shakib et al. | ................... | 707/8 |
| 6,321,133 B1 * | 11/2001 | Smirnov et al. | ............. | 700/100 |
| 6,546,364 B1 * | 4/2003 | Smirnov et al. | ............. | 700/100 |
| 6,640,148 B1 * | 10/2003 | Miller et al. | ................. | 700/103 |
| 6,665,575 B2 * | 12/2003 | Betawar et al. | ............... | 700/87 |
| 6,754,556 B1 * | 6/2004 | Landers et al. | ................ | 700/98 |
| 6,754,885 B1 * | 6/2004 | Dardinski et al. | ........... | 717/113 |
| 7,089,530 B1 * | 8/2006 | Dardinski et al. | ............. | 700/83 |
| 7,280,948 B2 * | 10/2007 | Duggirala | .................... | 700/97 |
| 2003/0181991 A1 * | 9/2003 | Chau et al. | ..................... | 700/1 |

* cited by examiner

*Primary Examiner*—Albert DeCady
*Assistant Examiner*—Charles R Kasenge
(74) *Attorney, Agent, or Firm*—Blakely, Sokoloff, Taylor & Zafman LLP

(57) ABSTRACT

In one embodiment, a method for upfront specification of lot process parameters to enable automated processing is disclosed. The method comprises building a hierarchical representation of a process plan for a manufacturing object using data structures to represent operational flows of the manufacturing object, performing a query execution on the hierarchical representation to determine one or more of the data structures affected by a global flow change (GFC), and implementing a locking protocol to preserve data integrity in the one or more data structures affected by the GFC. Other embodiments are also described.

12 Claims, 9 Drawing Sheets

Original with GUID for each cell (310)

| FPA | R1 | Seq | LP | GUID |
|---|---|---|---|---|
| | 100 | 1,1,1 | | 1.1 |
| | 200 | 1,1,2 | <- Flags | 1.2 |
| | 300 | 1,1,3 | | 1.3 |
| | 400 | 1,1,4 | <- Flags | 1.4 |
| | 500 | 1,1,5 | | 1.5 |

Modified Route live using GUID (ADD) (320)

| FPA | R1 | Seq | LP | GUID |
|---|---|---|---|---|
| | 100 | 1,1,1 | | 1.1 |
| | 150 | 1,1,2 | | 2.1 |
| | 200 | 1,1,3 | <- Flags | 1.2 |
| | 300 | 1,1,4 | | 1.3 |
| | 400 | 1,1,5 | <- Flags | 1.4 |
| | 500 | 1,1,6 | | 1.5 | live using GUID (DEL) (330)

| FPA | R1 | Seq | LP | GUID |
|---|---|---|---|---|
| | 100 | 1,1,1 | | 1.1 |
| | 200 | 1,1,2 | <- Flags | 1.2 |
| | ~~300~~ | | | 1.3 |
| | 400 | 1,1,4 | <- Flags | 1.4 |
| | 500 | 1,1,5 | | 1.5 |

Modified Route live using GUID (RPL) (340)

| FPA | R1 | Seq | LP | GUID |
|---|---|---|---|---|
| | 100 | 1,1,1 | | 1.1 |
| | 150 | 1,1,2 | <- Flags | 1.2 |
| | 300 | 1,1,3 | <- Flags | 1.3 |
| | 400 | 1,1,4 | | 1.4 |
| | 500 | 1,1,5 | | 1.5 |

*FIG. 3*

| | GFCL | LPEL | FBEL | LPPL |
|---|---|---|---|---|
| GFCL | Only one GFC allowed at a time | • Before kicking out existing Lot Plan editing session, LPEL released first by a job launched from GFC UI and notified to LP UI via CLUI/CFUI pub/sub channel. LP UI can continue to view Lot Plan w/o being allowed to save changes<br>• Lot Plan flag signoff UI can be launched during GFC | • Before kicking out existing Flow Block editing session, FBEL released first by a job launched from GFC UI and notified to FB UI via CLUI/CFUI pub/sub channel. FB UI can continue to view Flow Block w/o being allowed to save changes | • Lot Plan editor opens one Lot Plan and locks it up with LPEL<br>• Make flow changes by issuing a LPPL on last operation approved on flow. When LPPL obtained, no save on LP<br>• When GFC is submitted, the existing Lot Plan editing session will be kicked out and LPPL will remain intact |
| LPEL | No Lot Plan editing allowed (rework route and flag modification included, but signout excluded) | Cannot obtain new LPEL | • When doing route assignment w/in Lot Plan editing session, route assignment will fail if FBEL is set on specified Route. If FBEL not currently set, then Lot Plan editor (system) will:<br>--obtain FBEL<br>--validate route<br>--assign route<br>--release FBEL<br>• When Flow Block editor opens an existing route assigned to some LP, it cannot change flow, but it can change re-work, alt-route, route description | Co-Exist with no restriction |
| FBEL | No Flow Block editing allowed | • When doing route assignment within Lot Plan being edited<br>--obtain FBEL<br>--validate route<br>--assign route<br>--release FBEL<br>• When Flow Block editor opens an existing route assigned to some LP, it cannot change flow, alt-route, route description | Only one editing session allowed at a time | Co-Exist with no restriction |
| LPPL | Cannot obtain new LPPL lock | Co-Exist with no restriction | Co-Exist with no restriction | Cannot obtain new LPPL |

| TXN NAME | Insert Before To | Insert After To | Delete To | Replace To | Insert Before From | Insert After From | Delete From | Replace From |
|---|---|---|---|---|---|---|---|---|
| AdjustLot | Y | Y | N | N | N/A | N/A | N/A | N/A |
| AdjustLot (OnProcess) | Y | Y | N | N | Y | Y | Y | Y |
| CEDAData | N/A | N/A | N/A | N/A | N/A | N/A | N/A | N/A |
| CreateLot | N | Y | N | N | N/A | N/A | N/A | N/A |
| FromStores | Y | Y | N | N | | | | |
| Hold | Y | Y | Y | Y | N/A | N/A | N/A | N/A |
| Merge | N | Y | N | N | N | Y | N | N |
| MoveIn | Y | Y | N | N | N/A | N/A | N/A | N/A |
| MoveOut | N | Y | N | N | Y | N | Y | Y |
| MoveOutAlt | N | Y | N | N | Y | N | Y | Y |
| MoveOutNS | Y | Y | N | N | Y | Y | Y | Y |
| MoveOutPL | N | Y | N | N | Y | N | Y | Y |
| MoveOutRgn | N | Y | N | N | Y | Y | Y | Y |
| Release | Y | Y | Y | Y | N/A | N/A | N/A | N/A |
| ResetMVIN | Y | Y | Y | Y | N/A | N/A | N/A | N/A |
| Rework | N | Y | N | N | Y | Y | Y | Y |
| Ship | N/A | N/A | N/A | N/A | | | | |
| Split | N | Y | N | N | N | Y | N | N |
| TakeLoss | | | N/A | | | | | |
| Terminate | N/A | N/A | N/A | N/A | | | | |
| ToStores | N/A | N/A | N/A | N/A | | | | |
| UndoLoss | | | N/A | | | | | |
| UndoMerge | N | N | N | N | N | N | N | N |
| UndoMoveOut | Y | N | N | N | N | Y | Y | Y |
| UndoMoveOutAlt | Y | N | N | N | N | Y | Y | Y |
| UndoMoveOutNS | Y | Y | N | N | Y | Y | Y | Y |
| UndoMoveOutPL | Y | N | N | N | N | Y | Y | Y |
| UndoMoveOutRgn | Y | Y | N | N | Y | Y | Y | Y |
| UndoRework | Y | Y | N | N | Y | Y | Y | Y |
| UndoShip | N/A | N/A | N/A | N/A | | | | |
| UndoSplit | N | N | N | N | N | N | N | N |
| UndoTerminate | Y | Y | N | N | N/A | N/A | N/A | N/A |
| UnStart | N | N | N | N | N/A | N/A | N/A | N/A |

Y: allowed
N: not allowed
N/A: not applicable
(If the lot does not move, "to" operation is the current operation)

|  | LPPL |
| --- | --- |
| MoveOut to | • Allow the MoveOut<br>• Auto-adjust lot to limbo state<br>• System remembers route name and operation name where the LPPL exists (i.e., remembers what the next operation was) |
| MoveIn to | • Allow the MoveIn<br>• No auto-adjust lot to limbo state<br>• If user places a LPPL at the current lot location and the lot is pre-MoveIn at this operation, allow lot to move in and get processed (because the lot might have been already waiting in the queue) |
| MoveOut from | • Allow the MoveOut<br>• Auto-adjust lot to limbo state<br>• System remembers route name and operation name of the operation that had the LPPL (i.e., remembers what the next operation was) |

*FIG. 7*

|  | ADD BEFORE | ADD AFTER | DELETE | REPLACE |
|---|---|---|---|---|
| MoveOut to | System will prevent the MoveOut until GFCL is cleared | System will allow the MoveOut | • System will prevent the MoveOut until GFCL is cleared<br>• if a LPPL is an operation referenced by GFCL, LPPL will move back by one operation in flow sequence | • System will prevent the MoveOut until GFCL is cleared<br>• System will maintain LP context information for replaced operation |
| MoveIn to | System will allow the MoveIn | System will allow the MoveIn | • System will prevent the MoveIn until GFCL is cleared<br>• System will auto-adjust lot to limbo state (*without Lotplan and flowplan while knowing where it comes from affected Lotplan*), delete operation, and auto-adjust lot back to flow where it left if allowed by Lotplan<br>• System will remember the route name and operation name of the operation referenced by GFCL (i.e., remember what was the operation the Lot just left).<br>• System will remember whether or not the lot is moved in before limbo state<br>• If Lotplan doesn't allow the lot to be auto-adjusted back to flow where it left, manual intervention is required to continue the lot movement | • Same as in DELETE case<br>• System will maintain LP context information for replaced operation |
| MoveOut from |  | System will prevent the MoveOut until GFCL is cleared | • System will allow the MoveOut<br>• If lot is not done with MoveOut prior to GFC, system will auto-adjust lot to limbo state, delete operation, and auto-adjust lot back to flow where it left if allowed by lotplan<br>• System will remember the route name and operation name of the operation referenced by GFCL (i.e., remember what was the operation the Lot just left).<br>• System will remember whether or not the lot is moved in before limbo state<br>• If Lotplan doesn't allow the lot to be auto-adjusted back to flow where it left, manual intervention is required to continue the lot movement | • Same as in DELETE case<br>• System will maintain Lotplan context information for replaced operation |

MECHANISM FOR EXECUTION OF GLOBAL FLOW CHANGES IN A MANUFACTURING SYSTEM

FIELD OF THE INVENTION

The embodiments of the invention relate generally to the field of semiconductor processing and, more specifically, relate to a mechanism for execution of global flow changes in a manufacturing system.

BACKGROUND

When managing a semiconductor manufacturing facility, users typically modify commonly used flows, which takes a substantial amount of time and system resources. Generally, a semiconductor manufacturing line is utilized for experimental processing or high-volume manufacturing. Both manual local flow changes and automatic global flow changes should be supported no matter where an object resides on the manufacturing line.

When managing experimental processing on a semiconductor manufacturing line, the focus is on flexibility, robustness, efficiency and accuracy. Flexibility is important in that the engineer should be able to construct any valid flow and any valid set of special processing conditions. Robustness is valuable in that whatever the engineer specifies should be carried out by the operator in the semiconductor manufacturing facility, which can be especially challenging when the processing conditions are very new. Efficiency is important in that the pace of technology development demands rapid experimentation and analysis, so the configuration system should support very efficient interaction. Accuracy is beneficial in that the engineer should take into account a large amount of information when changing experimental flows, including up-to-the-minute processing information.

When managing high performance volume manufacturing, the focus is on throughput, control, and continuous improvement. In this environment, many lots in the semiconductor manufacturing facility may be running against a common flow. These lots are at various stages of processing—some just beginning, some in the middle of the flow, and some near the end. Often, the standard flow is revised to address systemic issues—perhaps to add an additional step to improve consistency or performance, or remove a step for efficiency. This change may be made to the common flow, and propagated to all lots using that flow very efficiently.

Current systems supporting flow changes are designed so that the manufacturing execution system primarily serves efficient mass changes. Additionally, current systems include configuration and execution systems as distinct components that control the semiconductor manufacturing facility. Manual local or automatic global flow changes are separately applied to both of the loosely-coupled configuration and execution systems. Mismatches resulting from flow changes to the two systems can be detected. However, actions taken by the systems to prevent misprocessing are inefficient. Typically, the actions involve manual intervention to bring flow changes to a consistent state.

Furthermore, under the current state of the art, systems that support flexible experimental manufacturing are typically developed as sidecar systems that exist alongside the mainstream standard high-volume manufacturing systems. As a result, experimental configuration is typically done ad hoc, through off-line processing and paper trails, or through development of the sidecar system to specify experimental processing while not tied to the execution systems. The combination of sidecar and execution systems allows for flexible specification, but has all of the limitations of inefficient mass changes. In addition, this combination can result in the two systems being mismatched, resulting in an indeterminate specification of flow.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 illustrates a table defining fields of a template according to embodiments of the invention;

FIG. 5 is a table depicting the interactions between the locking protocols according to embodiments of the invention;

FIG. 6 is a table illustrating the integration of a global flow change with lot movement transactions according to one embodiment of the invention;

FIG. 7 is a table describing rules that dictate manual local flow changes in a manufacturing execution system according to embodiments of the invention;

FIG. 8 is a table describing rules that dictate automatic global flow changes in a manufacturing execution system according to embodiments of the invention.

DETAILED DESCRIPTION

Figure 1:
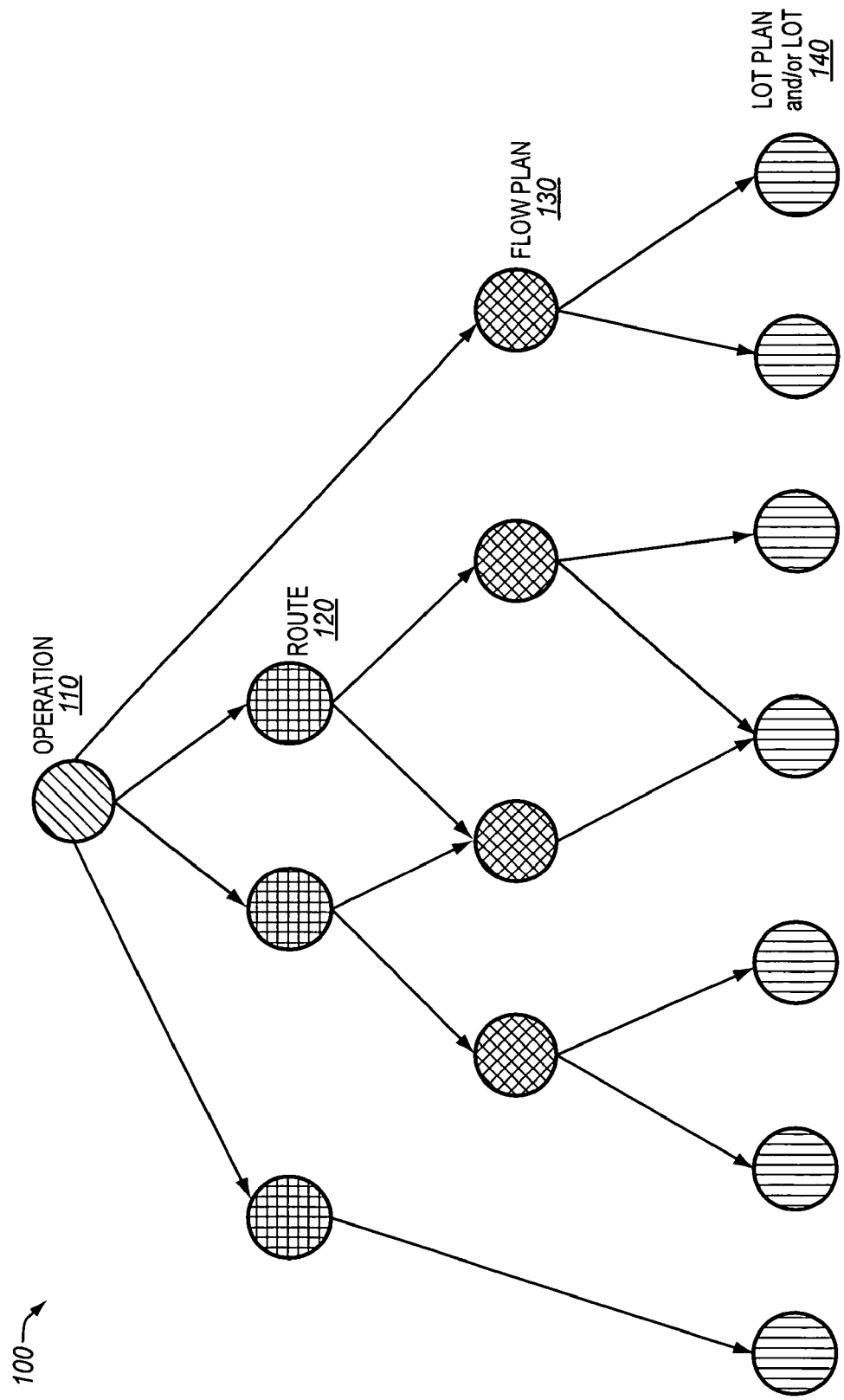
FIG. 1 illustrates a block diagram of multi-level operational flow for a semiconductor manufacturing system according to embodiments of the invention.

A method and apparatus for execution of global flow changes in a manufacturing system are described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, a variety of terms of art are used, as defined by the following:

Object: The unit that is tracked and processed during manufacturing. In semiconductor processing, the manufacturing object is a lot typically including up to, e.g., 25 wafers. An object may also be known as a manufacturing object.

Operational Flow: A representation of the sequence and details of activities required to manufacture an object or objects. In semiconductor processing, the operational flow typically refers to the sequence of steps that a lot of wafers undergoes.

Standard Flow: An operational flow that has been defined and approved to be used as a baseline reference for standard processing. Standard baseline material is typically processed on one or more standard flows.

Partial Standard Flow Reference (Route Snippet): A reference to a segment of a standard flow. Referencing implies that standard flow changes are immediately reflected in partial standard flow references.

Historical Flow: A representation of the sequence and details of activities that have already been performed on an object. In semiconductor processing, the historical flow is the sequence of steps that a lot has undergone.

Future Flow: A representation of the sequence and details of activities that are intended to be performed on an object. In semiconductor processing, the future flow is the sequence of steps that a lot will undergo in the future.

Object-Specific Data: Data that is stored separately for each object. Object-specific data is highly customized for an individual object. Generally, one-by-one updates are required for object-specific data when a common change is to take place.

Global Flow Change (GFC): A flow change that impacts a large number of objects and flows. For example, replace step 46 with step 48 in all flows.

Embodiments of the invention provide an integrated system that constructs a hierarchical representation of operational flows of a semiconductor manufacturing facility's manufacturing execution system (MES), manage locking mechanism for users to complete three distinct phases (query/locking/execution) of global flow changes (GFC), while maintaining data integrity and consistency in the MES. Embodiments also provide automation capability in MES systems that enable the specification and execution of lots and wafers in an efficient manner.

Embodiments of the invention utilize locking protocols to enforce and protect data integrity in a MES, while allowing for local and global changes to be executed throughout the MES. In order to utilize the locking protocols, the MES should obtain a hierarchical representation of process plans in the system by using data structures for the operation flows in the process plan. The hierarchy of a process plan during the planning phases is as follows: Flow Plan→Route→Subroute→Operation Block→Operation. In addition, the hierarchy of a process plan during execution is a follows: Flow Plan→Route→Operation. These hierarchies are used to construct data structures representative of the different levels of the process plan.

FIG. 1 illustrates one embodiment of a hierarchical structure 100 of different process plan data structures. A variety of process plans are shown for a multitude of manufacturing objects (i.e., lots) 140. Each process plan may follow a different path through the hierarchical structure 100. For example, one process plan for a lot may include an operation 110 as part of a route 120. The route, in turn, is part of a flow plan 130. The flow plan is part of a lot plan 140 for the lot (or for many lots). As illustrated, a route 120 may contain many operations 110, a flow plan 130 may contain many routes 120, and a lot plan and/or a lot140 may contain many flow plans 130.

In one embodiment, once the hierarchical representation of a process plan in a MES is constructed and understood, such as shown in FIG. 1, it is possible to perform a query execution for any GFCs to the MES. The query execution clarifies which data structures are affected by a GFC. For example, a GFC to an operation 110 affects all routes 120, flow plans 130, and lot plans 140 that are connected to the operation 110 in the hierarchical structure 100 of the particular process plan for the operation 110.

Figure 2:
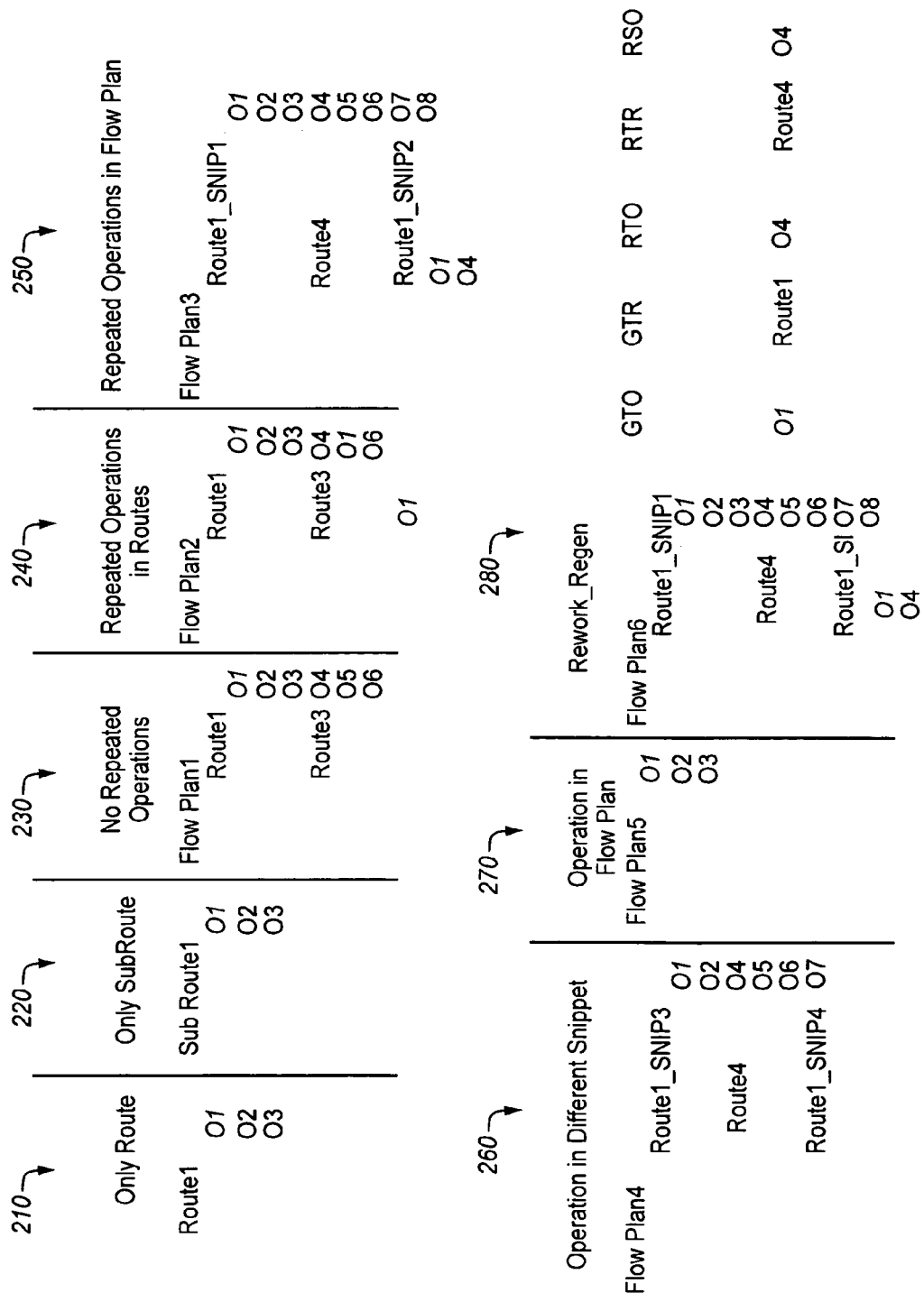
FIG. 2 illustrates a table depicting a template of one embodiment of the invention.

FIG. 2 is a table illustrating one embodiment of the variety of process plans containing an operation that exists in an MES. In one embodiment, the process plans shown are the same as the hierarchical structure 100 of process plans depicted with respect to FIG. 1. As illustrated, an operation (e.g., operation 'O1') may exist in: a route only 210 (a single time 230 or repeatedly 240), a subroute only 220, a flow plan (repeatedly 250 or a single time 270), a different snippet 260, and different types of operations affecting a rework 280. The operations affecting a rework 280 may include a Go-To-Operation (GTO), Go-To-Route (GTR), Return-To-Operation (RTO), Return-To-Route (RTR), and Reset-To-Operation (RTO).

In addition, embodiments of the invention further utilize immutable identifiers of operational flows on process plans shared by lot and experiment objects to manage and track where and how locking protocols should be implemented. FIG. 3 illustrates various embodiments of how an immutable identifier, also known as a Globally Unique Identifier (GUID), is used to manage GFCs so that a MES may continue processing lots during a GFC. The continued processing includes the functions of checking for flags, signing out flags, and editing flags and flow during lot rework.

Embodiments of the invention refer to the GUID as immutable because it may not be changed or altered by GFCs occurring in the MES. This characteristic allows for a data structure to be easily tracked and managed throughout any changes to the MES. For example, a lot runs on a process plan by pointing to a process plan object. An experiment may point to that same process plan object, and be further overlaid with special processing flags. In turn, for ease of tracking and management, the process plan object may be represented by immutable GUID for tracking and management purposes.

Returning to FIG. 3, illustrated is an embodiment of four tables each showing a process plan (i.e., lot plan) of a lot. Table 310 depicts an original lot plan with a GUID for each cell. The GUID represent a specific step in the process plan for the lot. The first column, FPA, represents the flow plan (e.g., flow plan A) of the lot. The second column, R1, represents the route (e.g., route 1) of the lot, with the specific operations of the route listed in the column of the route (operations 100 through 500). Then, the third column, SEQ, represents the sequence in the process plan represented by the particular operation.

The fourth and fifth columns, together as LP, represent context flags for the particular operation in the row, such as in the case of an experimental flow. For instance, in semiconductor manufacturing systems, context flags are used to manage a wafer across different processes. The flags represent special instructions for a particular step in the process that determines how the wafer will be moved along the particular step. Finally, the last column, GUID, represents the unique identifier assigned to the specific combination of flow plan, route, operation, and flag for the lot. In embodiments of the invention, the GUID may be used to track and manage process plans for lots in an MES.

Tables 320, 330, 340 illustrate how a GUID is used to manage GFCs, such as add, delete, and replace types of flow changes. In some embodiments, the GUID may be utilized to enable the MES to continue processing the lots during these GFCs. The GFC of an add flow change is depicted in table 320. As shown, operation 150 is being added to the process plan of the lot. This operation is assigned a new GUID (i.e., 2.1), and the remaining operations retain their original GUIDs. The GFC of a delete flow change is depicted in table 330. As shown, operation 300 is being deleted from the process plan for the lot. The GUID operation being deleted goes with the operation and is not reused. Finally, the GFC of a replace flow change is depicted in table 340. As shown, operation 200 is being replaced by operation 150. In this case, because an operation is being replaced, the GUID (i.e., 1.2) remains the same and is assigned to the new operation 150.

Once the hierarchy of data structures with corresponding immutable identifiers (e.g., GUIDs) has been established, locking protocols may be implemented to ensure data consistency and integrity while applying changes to the various data structures in the hierarchy. In some embodiments, a GFC notification message may be broadcasted through the MES at specified time intervals to notify the system of an impending GFC. Once the notification message is received, locking protocols may be implemented to handle concurrent changes among the manufacturing objects in the system. These locking protocols operate to prevent users from manually editing any sections of operational flows that are slated for changes.

The following locking mechanisms may be implemented to support GFC changes in an MES. A Lot Plan Editor Lock (LPEL) may be implemented for locking tracking on an experiment object for concurrent editing. A Flow Block Editor Lock (FBEL) may be implemented for locking tracking on routes, subroutes, and operation block objects. A Lot Plan Process Lock (LPPL) may be implemented for locking an experiment object for in-site editing of active lot flows. Finally, a Global Flow Change Lock (GFCL) may be implemented for locking tracking on operation objects for lot movement transaction support before and during the GFC.

Figure 4:
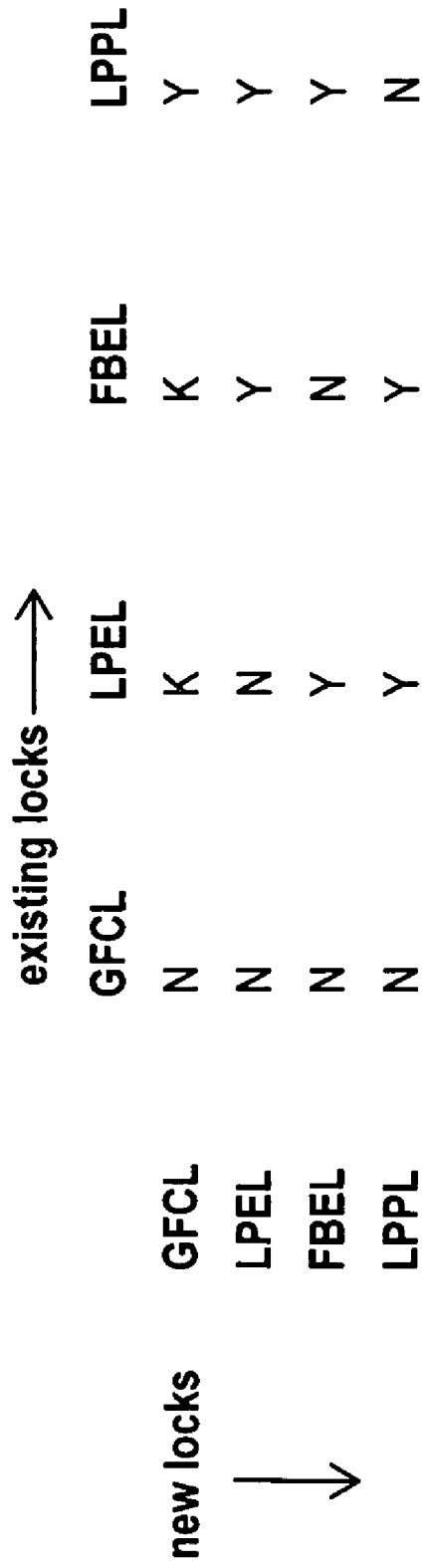
FIG. 4 is a flow diagram of a method of one embodiment of the invention.

FIG. 4 is a table depicting an embodiment of the various interactions of the locking protocols implemented in an MES system. As shown, locks that are already in place are shown on the top row of the table, while locks that the MES is trying to implement are listed on the leftmost column of the table. The table illustrates whether the two locks are allowed to co-exist.

For example, if a GFCL is in place, then no other locks are allowed to co-exist with the GFCL. If a LPEL is in place, then it will be released if a GFCL is implemented, not allowed to co-exist with another LPEL, and allowed to co-exist with a FBEL and a LPPL. If a FBEL is in place, then it will be released if a GFCL is implemented, not allowed to co-exist with another FBEL, and allowed to co-exist with an LPEL and a LPPL. Finally, if a LPPL is in place, then it may co-exist with a GFCL, LPEL, and FEBL, but not co-exist with another LPPL.

FIG. 5 is a table further depicting the interactions between the various locking protocols (i.e., those described with respect to FIG. 4) according to embodiments of the invention. These interactions may be utilized to create a locking implementation algorithm that may be enforced in a MES system. The descriptions in the table describe how the locking protocols are obtained and released. The descriptions in the table also describe how the users of a GFC system send notifications among each other from, for example, a GFC user interface (UI). These users may also send notifications to other users doing non-GFC related editing from non-GFC UIs such as a Lot Plan Editor UI or a Flow Plan Editor UI through an underlying Publish/Subscribe-based communication mechanism. The descriptions in FIG. 5 describe how the overall GFC system and other non-GFC related manufacturing systems work together as a whole to protect data integrity and prevent costly misprocessing risks.

In embodiments of the invention, the locking protocols provide data consistency protection and change management.

In one example, if a route is modified via a GFC, then all flow plans using that route are modified whether the lots using them are before or after the change. After the route is modified, context synchronizations may be performed within the same transaction automatically. These context synchronizations include experiment contexts that reference flow plans using the modified route and lot process contexts that reference flow plans using the modified route. FIG. 6 is a table illustrating one embodiment of the integration of a GFC with lot movement transactions in a MES. As depicted, the table shows how and when synchronizations may take place in a MES with locking protocols implemented.

Embodiments of the invention also provide a mechanism to respond to a situation where a lock is applied and a lot is blocked from proceeding because of the lock. In some cases, a 'limbo state' may be applied to the lot. A limbo state adjusts the lot so that it no longer references its process plan, in order to avoid misprocessing of the lot during any changes. The data integrity in the MES during lot movement transactions is protected by enforcing transaction-level compatibility logics that are consistent with the locking protocols.

For example, a lock may be put on an operation in the MES that stops lots from progressing down a particular route that includes the operation. Changes may be made to the route that requires removing operations that a particular lot may be presently on. As a result, the lot is adjusted to a special state (i.e., a limbo state) while having no process plan attached. Meanwhile, the MES may continue to maintain the one-way association from experiment to lot.

FIG. 7 is a table illustrating one embodiment of the application of some of the rules dictating manual local flow changes management and the application of a limbo lot state. Specifically, the table shows the application of a LPPL against particular operations (e.g., MoveOut to, MoveIn to, and MoveOut from). To better understand FIG. 7, the following description provides further detail and explanation. First, assume that Lot1 is at Operation_2 (Op_2) after it is done with the processing at Operation_1 (Op_1). A MoveIn transaction for Lot1 affects Op_2 only, and indicates that Lot1 is ready for processing at Op_2. A MoveOut transaction for Lot1 affects Op_2 and Operation_3(Op_3). At the end of MoveOut, Lot1 moves to Op_3.

The first row in the table, "MoveOut to", may be described as follows:

Before MoveOut Occurs:

| Operational Flow | Lot Location in Flow | Limbo | MoveIn | Locks in Flow | Description |
|---|---|---|---|---|---|
| Op_1 out to Op_2 | Lot1 | No | No | | Lot1 ready to move |
| Op_2 | | | | LPPL | LPPL exists on Op_2 |

After MoveOut Completed:

| Operational Flow | Lot Location in Flow | Limbo | MoveIn | Locks in Flow | Description |
|---|---|---|---|---|---|
| Op_1 out to Op_2 | | | | | Lot1 already moved |
| Op_2 | Lot1 | Yes | No | LPPL | LPPL exists on Op_2 |

The second row in the table, "MoveIn to", may be described as follows

Before MoveIn Occurs:

| Operational Flow | Lot Location in Flow | Limbo | MoveIn | Locks in Flow | Description |
|---|---|---|---|---|---|
| Op__1 | Lot1 | No | No | LPPL | LPPL exists on Op__1 |

After MoveIn Complete:

| Operational Flow | Lot Location in Flow | Limbo | MoveIn | Locks in Flow | Description |
|---|---|---|---|---|---|
| Op__1 | Lot1 | No | Yes | LPPL | LPPL exists on Op__1 |

The third row in the table, "MoveOut from", may be described as follows:

Before MoveOut Occurs:

| Operational Flow | Lot Location in Flow | Limbo | MoveIn | Locks in Flow | Description |
|---|---|---|---|---|---|
| Op__1 | Lot1 | No | No | LPPL | LPPL exists on Op__1 |

After MoveOut Completed:

| Operational Flow | Lot Location in Flow | Limbo | MoveIn | Locks in Flow | Description |
|---|---|---|---|---|---|
| Op__1 | | | | LPPL | LPPL exists on Op__1 |
| Op__2 | Lot1 | Yes | No | | Lot1 moves out from Op__1 to Op__2 |

FIG. 8 is a table illustrating one embodiment of the application of some of the rules that dictate global flow changes management and the application of a limbo lot state. Specifically, the table shows the application of a GFCL against particular operations (e.g., MoveOut to, MoveIn to, and MoveOut from). To better understand FIG. 8, the following description provides further detail and explanation of the first row of the table.

According to the first row in the table, if a Lot attempts to MoveOut to an operation referenced by GFCL, the system acts accordingly depending on following GFC type:

MoveOut Cases:

| Operational Flow | Lot Location in Flow | Limbo | MoveIn | Locks in Flow | Description |
|---|---|---|---|---|---|
| Op__1 out to Op__2 | Lot1 | No | No | | Lot1 ready to move out to Op__2 |

-continued

| Operational Flow | Lot Location in Flow | Limbo | MoveIn | Locks in Flow | Description |
|---|---|---|---|---|---|
| Op__2 | | | | GFCL, LPPL | GFCL, LPPL exist on Op__2 |

(1a) Add an operation before Operation__2: rule states Lot1 cannot move out of Operation__1
(1b) Add an operation after Operation__2: rule states Lot1 will be able to move out of Operation__1 to Operation__2
(1c) Delete operation__2: rule states Lot1 cannot move out of Operation__1

Before Deletion:

| Operational Flow | Lot Location in Flow | Limbo | MoveIn | Locks in Flow | Description |
|---|---|---|---|---|---|
| Op__1 out to Op__2 | Lot1 | No | No | | Lot1 ready to move |
| Op__2 | | | | GFCL, LPPL | GFCL, LPPL exist on Op__2 |

After Deletion (LPPL originally on Operation__2 is moved back one operation in the flow to Operation__1):

| Operational Flow | Lot Location in Flow | Limbo | MoveIn | Locks in Flow | Description |
|---|---|---|---|---|---|
| Op__1 out to Op__2 | Lot1 | No | No | LPPL | Lot1 ready to moveout to Op__2 |

By utilizing all of the elements of embodiments of the invention described above, a lot plan flow design for efficient flow changes may be implemented in an MES. Embodiments of the invention combine flexible manufacturing with efficient mass changes. Tightly integrated configuration and execution manufacturing systems are enabled through hierarchical representation of operational flows to build inclusion and exclusion list of affected lots. Furthermore, embodiments of the invention provide for enhanced interaction in an MES by enabling broadcast messages to affected users, AND/OR query execution to prepare for flow changes, asynchronous invocation to improve the user response, and integration of query results into flow execution.

Figure 9:
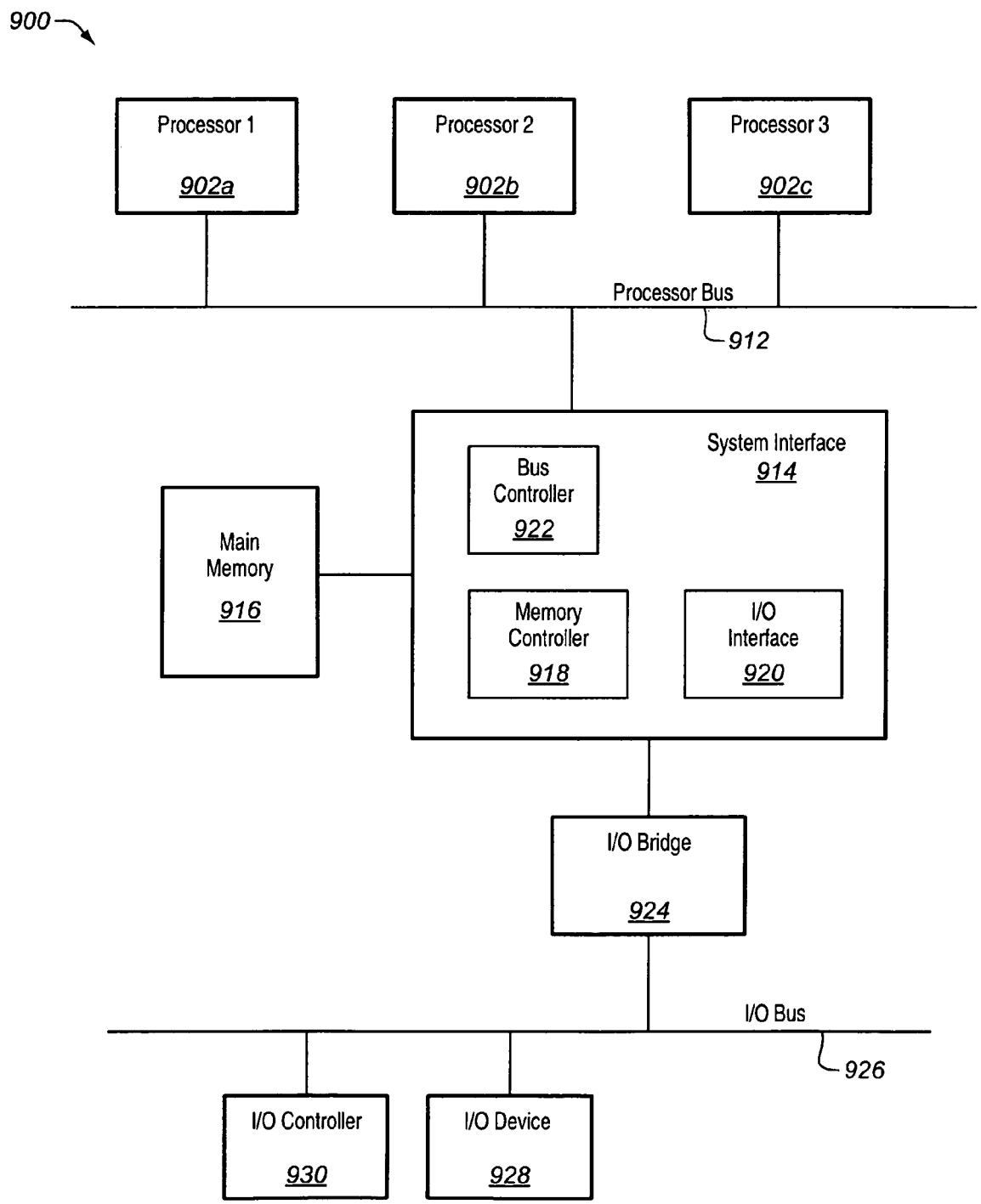
FIG. 9 illustrates a block diagram of one embodiment of a computer system.

FIG. 9 is a block diagram illustrating an exemplary computer system 900 used in implementing one or more embodiments of the invention. The computer system (system) 900 includes one or more processors 902*a-c*. The processors 902*a-c* may include one or more single-threaded or multi-threaded processors. A typical multi-threaded processor may include multiple threads or logical processors, and may be capable of processing multiple instruction sequences concurrently using its multiple threads.

Processors 902*a-c* may also include one or more internal levels of cache and a bus controller or bus interface unit to direct interaction with the processor bus 912. As in the case of chip multiprocessors or multi-core processors, processors 902*a-c* may be on the same chip. The chip may include shared caches, interprocessor connection network and special hardware support such as those for SPT execution (not shown).

Furthermore, processors 902a-c may include processor cores. Processor bus 912, also known as the host bus or the front side bus, may be used to couple the processors 902a-c with the system interface 914.

System interface 914 (or chipset) may be connected to the processor bus 912 to interface other components of the system 900 with the processor bus 912. For example, system interface 914 may include a memory controller 918 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. For example, as illustrated, the I/O interface 920 may interface an I/O bridge 924 with the processor bus 912. I/O bridge 924 may operate as a bus bridge to interface between the system interface 914 and an I/O bus 926. One or more I/O controllers and/or I/O devices may be connected with the I/O bus 926, such as I/O controller 928 and I/O device 930, as illustrated. I/O bus 926 may include a peripheral component interconnect (PCI) bus or other type of I/O bus.

System 900 may include a dynamic storage device, referred to as main memory 916, or a random access memory (RAM) or other devices coupled to the processor bus 912 for storing information and instructions to be executed by the processors 902a-c. Main memory 916 may also be used for storing temporary variables or other intermediate information during execution of instructions by the processors 902a-c. System 900 may include a read only memory (ROM) and/or other static storage device coupled to the processor bus 912 for storing static information and instructions for the processors 902a-c.

Main memory 916 or dynamic storage device may include a magnetic disk or an optical disc for storing information and instructions. I/O device 930 may include a display device and/or an input device. System 900 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 900 may be coupled with a number of clients and/or servers via a conventional network infrastructure, such as a company's intranet and/or the Internet, for example.

It is appreciated that a lesser or more equipped system than the example described above may be desirable for certain implementations. Therefore, the configuration of system 900 may vary from implementation to implementation depending upon numerous factors, such as price constraints, performance requirements, technological improvements, and/or other circumstances.

It should be noted that, while the embodiments described herein may be performed under the control of a programmed processor, such as processors 902a-c, in alternative embodiments, the embodiments may be fully or partially implemented by any programmable or hardcoded logic, such as field programmable gate arrays (FPGAs), transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:

building a hierarchical representation of a process plan for a manufacturing object using data structures to represent operational flows of the manufacturing object;

performing a query execution on the hierarchical representation to determine one or more of the data structures affected by a global flow change (GFC); and implementing a locking protocol, including least a lot plan editor lock (LPEL), flow block editor lock (FBEL), lot plan process lock (LPPL), and global flow change lock (GFCL), to preserve data integrity in the one or more data structures affected by the GFC;

wherein the LPEL locks on an experiment object for concurrent editing, the FBEL tracks locking on at least one of a route, subroute, and operation block object, the LPPL locks an experiment object for in-site editing of active flow lots, and the GFCL tracks locking on operation objects for lot movement transaction support before and during the GFC.

2. The method of claim 1, further comprising:

utilizing a globally unique identifier (GUID) to represent the process plan affected by the GFC, wherein the process plan includes at least one of an operation, a route, a flow plan, and a lot plan.

3. The method of claim 2, wherein the GUID remains the same through application of the GFC, wherein the GFC is a flow change to the operation including at least one of an add flow change, delete flow change, and a replace flow change.

4. The method of claim 1, further comprising broadcasting a CFC notification message before the GFC is to occur.

5. The method of claim 1, wherein the locking protocol implements locking mechanisms to interact together to create a locking algorithm to prevent changes to the one or more data structures affected by the GFC.

6. A machine-readable medium having stored thereon data representing sets of instructions that, when executed by a machine, cause the machine to perform operations comprising:

building a hierarchical representation of a process plan for a manufacturing object using data structures to represent operational flows of the manufacturing object;

performing a query execution on the hierarchical representation to determine one or more of the data structures affected by a global flow change (GFC); and implementing a locking protocol, including a lot plan editor lock (LPEL), flow block editor lock (FBEL), lot plan process lock (LPPL), and global flow change lock (GFCL), to preserve data integrity in the one or more data structures affected by the GFC;

wherein the LPEL locks on an experiment object for concurrent editing, the FBEL tracks locking on at least one of a route, subroute, and operation block object, the LPPL locks an experiment object for in-site editing of active flow lots, and the GFCL tracks locking on operation objects for lot movement transaction support before and during the GFC.

7. The machine-readable medium of claim 6, further comprising:

utilizing a globally unique identifier (GUID) to represent the process plan affected by the GFC, wherein the process plan includes at least one of an operation, a route, a flow plan, and a lot plan.

8. The machine-readable medium of claim 7, wherein the GUID remains the same through application of the GFC, wherein the GFC is a flow change to the operation including at least one of an add flow change, delete flow change, and a replace flow change.

9. The machine-readable medium of claim 6, further comprising broadcasting a GFC notification message before the GFC is to occur.

10. The machine-readable medium of claim 6, wherein the locking protocol implements locking mechanisms to interact together to create a locking algorithm to prevent changes to the one or more data structures affected by the GFC.

11. A system, comprising:

a control system for a semiconductor manufacturing system having one or more processors to execute a manufacturing execution system (MES), wherein the MES is configured to:

build a hierarchical representation of a process plan using data structures for the operational flows;

perform a query execution to determine one or more of the data structures affected by a global flow change (GFC); and implement a Locking protocol to preserve data integrity in the one or more data structures affected by the GFC by applying one or more locking mechanisms to interact together to create a locking algorithm to prevent changes to the one or more data structures affected by the GFC;

wherein the locking mechanisms including a lot plan editor lock (LPEL) to track locking on an experiment object for concurrent editing, a flow block editor lock (FBEL) to track locking on at least one of a route, subroute, and operation block object, a lot plan process lock (LPPL) to lock an experiment object for in-site editing of active flow lots, and a global flow change lock (GFCL) to track locking on operation objects for lot movement transaction support before and during the GFC.

12. The system of claim 11, further comprising the MES to utilize a globally unique identifier (GUID) to represent the process plan affected by the GFC, wherein the process plan includes at least one of an operation, a route, a flow plan, and a lot plan.

* * * * *